United States Patent Office 3,547,963
Patented Dec. 15, 1970

3,547,963
GROUP VIII METAL COMPLEXES CONTAINING TWO COMPLEXED $B_{10}H_{12}^{-2}$ IONS
Frank Karl Klanberg, Wilmington, Del., assignor to E. I. du Pont de Nemours and Company, Wilmington, Del., a corporation of Delaware
No Drawing. Filed Mar. 26, 1968, Ser. No. 715,961
Int. Cl. C07d 15/00, 15/02; C09b 57/00
U.S. Cl. 260—429
10 Claims

ABSTRACT OF THE DISCLOSURE

Compounds containing an anion composed of a Group VIII metal complexed with two $(B_{10}H_{12})$ groups can be made by a ligand displacement reaction of a Group VIII metal compound with an alkali or alkaline earth metal salt of $B_{10}H_{13}^-$. For the first transition series, the Group VIII halides or alkyl and aryl phosphine or arsine complexes can be used as the starting material. For the second transition series alkyl phosphine or arsine complexes and olefin complexes and for the third transition series, olefin complexes can be used.

The compounds are useful as dyes for cotton and as catalysts.

SUMMARY OF THE INVENTION

The new compounds of the present invention can be defined by the formula

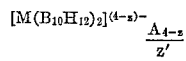

in which M is a metal of Group VIII of the Periodic Table, Z is the valence of M and is from 1 to 3 inclusive, A is a cation of valence $z'$.

This invention also comprises a method of making the above compounds by reacting, in solution in an inert solvent, a salt of $B_{10}H_{13}^-$ with a transition metal compound having the formula

in which:

$x$ is the number of the transition series of the Group VIII metal M, i.e., when $x=1$, M is iron, cobalt or nickel, when $x=2$, M is ruthenium, rhodium or palladium and when $x=3$, M is osmium, iridium or platinum;

X is a halogen having an atomic number of 17 to 53, i.e., chlorine, bromine or iodine;

$n^1$ is 0, 1 or 2 and $n^2$ and $n^3$ are each 2;

$L^1$ is an electron donating ligand of the formula $$QR_3 \text{ or } QAr_3$$

and two $L^1$ are jointly $$R_2Q—(CH_2)_m—QR_2 \text{ of } Ar_2Q—(CH_2)_m—QAr_2$$

$L^2$ is $QR_3$, acyclic monolefin to 2 to 12 carbon atoms, and the two of $L^2$ can be an $R_2Q—(CH_2)_mQR_2$, alicyclic 1,4-diolefin of 6 to 12 carbon atoms or an alicyclic 1,5-diolefin of 8 to 12 carbon atoms.

$L^3$ is an acyclic monolefin of 2–12 carbon atoms, and two $L^2$ jointly can be an alicyclic 1,4-diolefin of 6 to 12 carbon atoms, or an alicyclic 1,5-diolefin of 8 to 12 carbon atoms; wherein Q is arsenic or phosphorus, R is an alkyl radical, Ar is an aryl radical and $m$ is 2 or 3, with the proviso that the number of carbon atoms per phosphorus or arsenic atom does not exceed 20.

DETAILED DESCRIPTION OF THE INVENTION

The compounds of the present invention are salts which are in general yellow to red in color, are stable in air in the solid state, and which are generally obtained as well-formed crystals. The nickel and cobalt compounds are stable to oxidation by air in solution. The compounds are hydrolyzed by bases to give salts of $B_9H_{14}^-$.

The essence of the present invention is the discovery of a new class of anion comprising a transition metal of Group VIII complexed with two $B_{10}H_{12}$ groups. To provide electrical neutrality, the new transition metal anions must be associated with an equivalent of a cation. The cation can be any water-stable cation which is inert to the anions of this invention. Among the metal ions, the alkali metal and alkaline earth metal ions are preferred, as are organic onium ions, i.e., lower alkyl phosphonium, ammonium, arsonium and sulfonium cations.

By lower alkyl is meant an alkyl group of up to six carbon atoms.

The organic onium cations, as defined above, are particularly useful in facilitating the isolation of the products of this invention from solution, since the onium salts are generally sparingly soluble in water, and are well-crystallized compounds. Other salts can be made by conventional metathetical reactions and particularly by ion exchange methods which are well known to those skilled in the art.

The complex compounds of the present invention are made by a ligand displacement reaction between certain Group VIII metal compounds having electron-donating ligands as defined hereinabove and salts of $B_{10}H_{13}^-$. Alkali and alkaline metal salts of $B_{10}H_{13}^-$ are preferred.

In general, the preparation of the complexes of this invention is carried out by mixing suitable solutions of salts of $(B_{10}H_{13})^-$ with solutions of the Group VIII metal compound. Reaction occurs spontaneously on standing at ambient temperatures and pressures. Stirring, or other means of agitation, is not essential but usually effects a modest increase in the reaction rate. While ambient temperatures suffice, it may occasionally be desired to warm the reaction mixtures, e.g., to about 50° C.; heating to as high as 125° C., although not necessary, does not cause any difficulty.

Usually the reactions are carried out at atmospheric pressure but operation from a few millimeters of mercury to several atmospheres is suitable. When the reactions are carried out in an inert atmosphere such as nitrogen, argon, or helium, it is convenient to operate at pressures somewhat above atmospheric. Some of the products of this invention are sensitive to oxygen and it is generally preferred to carry out the reactions in an inert atmosphere as here described.

Suitable solvents for the $B_{10}H_{13}^-$ salts include aliphatic ethers, nitriles, and water. The preferred solvents are diethyl ether and tetrahydrofuran.

Suitable solvents for the Group VIII metal halide derivatives are aliphatic ethers, nitriles, alcohols or water. The preferred solvents are tetrahydrofuran and acetonitrile.

The reactants used for preparing the compounds of this invention have been defined above. In the case of the first transition series metals, the simple chloride, bromide or iodide salts are operable and are preferred for reasons of cost. Further specific examples of the first transition series Group VIII metal derivatives, which are useful in preparing $(B_{10}H_{12})^=$ complexes include:

$[(C_2H_5)_3P]_2FeCl_2$,
$[(C_2H_5)_2PCH_2CH_2P(C_2H_5)]FeCl_2$,
$[(C_6H_5)_3P]_2FeBr_2$,
$[(C_6H_5)_2P—CH_2CH_2CH_2—P(C_6H_5)_2FeCl_2]$,
$[(C_6H_5)_3P]_2FeCl_2$,
$[(n—C_4H_3)_3As]_2FeCl_2$,
$[(C_6H_5)_2AsCH_2CH_2As(C_6H_5)_2]FeCl_2$,
$FeCl_2$, $FeBr_2$, $FeI_2$, $[(C_6H_{13})_3P]_2FeCl_2$.

Cobalt and nickel can be used in any of the specific examples given above; a still greater range of Group VIII halide complexes of the first transition series, limited only as defined, are operable in the process.

The reactant Group VIII members of the second transition series is somewhat narrower than those of the first transition series in that arylphosphine and arylarsine complexes usually cannot be used. Specific compounds usable in practicing this invention include:

$[(C_2H_5)_3P]_4RuCl_2$,
$[(C_2H_5)_2PCH_2CH_2P(C_2H_5)_2]_2RuCl_2$,
$[(2\text{-ethylhexyl})_3P]_4RuCl_2$,
$[(C_2H_5)_2PCH_2CH_2CH_2P(C_2H_5)_2]_2RuCl_2$,
$[(C_2H_5)_3P]_3RuCl_2$,
$[(CH_3)_3P]_2PdCl_2$,
$[(C_2H_5)_3P]_2PdCl_2$,
$[(n-C_4H_9)_3P]_2PdBr_2$,
$[(C_2H_5)_2PCH_2CH_2P(C_2H_5)_2]PdCl_2$,
$[(C_2H_5)_2P-CH_2CH_2CH_2-P(C_2H_5)_2]PdBr_2$,
$[(n-C_8H_{17})_2n-C_4H_9P]_2PdCl_2$,
$[(n-C_6H_{13})_3P]_2PdCl_2$;

all of the above compounds can contain any of the Group VIII metals of the second transition series; reactants that contain suitable diolefin ligands are also included in these examples; thus: $[(1,5\text{-cyclooctadiene})RhCl]_2$, (norbornadiene)$RuCl_2$, (1,5-cyclooctadiene)$PdCl_2$, (1,5-cyclooctadiene)$RuCl_2$, (7,7-di-methylnorbornadiene)$PdCl_2$ are useful.

The reactants derived from Group VIII metals of the third transition series are further limited to olefinic ligands. These include (1,5-cyclooctadiene)$OsCl_2$, $[(1,5\text{-cyclooctadiene})IrCl]_2$, (norbornadiene)$OsCl_2$, [(norbornadiene)$IrCl]_2$, other dienes such as 1-methyl-7-methyl- and 7,7-di-methylnorbornadiene may also be employed as ligands in this group.

The $(B_{10}H_{13})^-$ salts may be any of those defined above; the most commonly available are $NaB_{10}H_{13}$ and $Ca(B_{10}H_{13})_2$, obtained by reaction of NaH and $CaH_2$, respectively, with $B_{10}H_{14}$. Other alkali metal and alkaline earth hydrides can be used to prepare $KB_{10}H_{13}$, $CsB_{10}H_{13}$, $RbB_{10}H_{13}$, $LiB_{10}H_{13}$, $Mg(B_{10}H_{13})_2$, $Ba(B_{10}H_{13})_2$
$Ca(B_{10}H_{13})_2$, $Sr(B_{10}H_{13})_2$ and all of these can be used in practicing this invention.

The products of this invention are often obtained as the salt of the cation derived from the $B_{10}H_{13}^-$ salt used in preparation and, unless these are the heavier metals the products are quite soluble. In these cases, it is convenient to isolate the sought $[M(B_{10}H_{12})]^{2-}$ complexes by precipitation with an onium compound that yields a relatively insoluble, well-crystallized form of the product. Tetramethylammonium chloride, tetraethylammonium chloride, trimethylsulfonium chloride, triethylsulfonium chloride, trialkylphosphines and trialkylarsines having lower alkyl, e.g., alkyls of up to 6 carbon atoms, may be employed.

UTILITY

The compounds of the present invention are generically useful as dyes for cotton.

In many instances the compounds of the present invention provide novel, soluble catalysts. Thus the complexes of cobalt and nickel catalyze the cyclooligomerization of acetylene to benzene and cyclooctatetraene. The cobalt complex $[(CH_3)_4N]_2[(B_{10}H_{12})_2Co]$ has also shown surprising activity in catalyzing the hydrogenation of olefinic double bonds under mild conditions of temperature and pressure.

This invention is further illustrated by the following specific examples, which should not, however, be construed as fully delineating the scope of this discovery.

EXAMPLE 1

$[(n-C_4H_9)_3PH]_2[Pd(B_{10}H_{12})_2]$

A mixture of 2.3 g. (0.004 mole) $[(n-C_4H_9)_3P]_2PdCl_2$ and 0.0057 mole $NaB_{10}H_{13}$ in 100 ml. of ether was stirred for 30 minutes. The precipitated solid was filtered off and washed with ether until the wash liquid was colorless. The residue (1.5 g.) was first crystallized from ether/tetrahydrofuran (30 ml.), and recrystallized from tetrahydrofuran to give 0.6 g. of yellow crystals of poorly defined habit, M.P. 158–161° C. dec.

*Analysis.*—Calc'd for $[(C_4H_9)_3PH]_2[Pd(B_{10}H_{12})_2]$ (percent): C, 38.3; H, 10.7; P, 8.2; Pd, 14.1; B, 28.7. Found (percent): C, 38.1; H, 10.6; P, 8.1; Pd, 13.9; B, 31.4.

The electronic spectrum in acetonitrile showed absorption at 3650 ($\epsilon$=4230), 3060 ($\epsilon$=26,900), and 2120 A. ($\epsilon$=15,200). The IR spectrum exhibited strong B-H absorption at 2560 and 2500 cm.$^{-1}$ as well as P-H band at 2300 cm.$^{-1}$.

EXAMPLE 2

$[(CH_3)_4N]_2[Ni(B_{10}H_{12})_2]$

A solution of 3.7 g. (0.005 mole) $[(C_6H_5)_3P]_2NiBr_2$ in 100 ml. of acetonitrile/tetrahydrofuran (1:1) was added to a solution of 0.010 mole of $NaB_{10}H_{13}$ in 50 ml. of ether. A brick-red solid, presumably the triphenylphosphonium salt of $[Ni(B_{10}H_{12})_2]^{2-}$, precipitated. This was filtered, dissolved in water, and then reacted with an excess of tetramethylammonium chloride. The resulting precipitate was recrystallized from methanol/acetone (2:1) to give 0.8 g. of cinnabar-red small crystals, dec.>200° without melting.

*Analysis.*—Calc'd for $[(CH_3)_4N]_2[Ni(B_{10}H_{12})_2]$ (percent): C, 21.5; H, 10.8; N, 6.3; Ni, 13.1; B, 48.4. Found (percent): C, 21.9; H, 10.8; N, 5.8; Ni, 12.9; B, 48.3.

The electronic spectrum in acetonitrile showed absorption at 4470 ($\epsilon$=4520), 3100 ($\epsilon$=25,400), and 2220 A. ($\epsilon$=17,580). The infrared spectrum displayed B-H absorption at 2500 cm.$^{-1}$ with a shoulder at 2570 cm.$^{-1}$. Another characteristic feature of the IR spectrum is a sequence of bands, in the order of increasing intensity, at 1031, 1008, and 989 cm.$^{-1}$.

The $H^1$ N.M.R. spectrum in $CD_3CN$ showed a $(CH_3)_4N^+$ peak at $\tau$=7.12 with $J_{N14-H1}$=0.6 Hz. (1:1:1 triplet). The $B^{11}$ N.M.R. spectrum at 19.3 Mc in acetone showed two pairs of overlapping doublets at 9.5 and 23.9 p.p.m., respectively, as well as a high-field doublet at 42.0 p.p.m. ($J_{B-H}$=142 Hz.). [$B(OCH_3)_3$=0.]

EXAMPLE 3

$[(C_2H_5)_4N]_2[Ni(B_{10}H_{12})_2]$

Essentially the same procedure as in Example 2 was used with 2.2 g. (0.010 mole) of $NiBr_2$ and 0.020 mole of $NaB_{10}H_{13}$ in 200 ml. (1:1) of ether/tetrahydrofuran. The reaction product was precipitated with tetraethylammonium chloride, and the resulting solid was recrystallized from 100 ml. of methanol.

*Analysis.*—Calc'd for $[(C_2H_5)_4N]_2[Ni(B_{10}H_{12})_2]$ (percent): C, 34.2; H, 11.5; N, 5.0; Ni, 10.5; B, 38.7. Found (percent): C, 34.5; H. 11.5; N, 5.2; Ni, 10.2; B, 40.5.

The electronic spectrum in methanol showed absorption at 4480 ($\epsilon$=4500) and 3100 A. ($\epsilon$=25,040).

EXAMPLE 4

$[(CH_3)_4N]_2[(B_{10}H_{12})_2Pd]$

A solution of $NaB_{10}H_{13}$ (0.060 mole) in 100 ml. of tetrahydrofuran was added to a slurry of 4.32 g. (0.015 mole) of dichloro(1,5-cyclooctadiene)palladium in 100 ml. of acetonitrile. The mixture was blanketed with $N_2$ or Ar during reaction and isolation. After stirring for 30 minutes, the reaction mixture was filtered. The precipitate was discarded and the filtrate concentrated to ca. 75 ml. The filtrate was diluted with 250 ml. of water and washed with four 150-ml. portions of petroleum ether. Addition of an aqueous solution of tetramethylammonium chloride to the aqueous layer gave a yellow solid. The solid was recrystallized from acetone/water to give 4.4 g. of light yellow crystals. The infrared spectrum is very similar to that of [(CH$_3$)$_4$N]$_2$[(B$_{10}$H$_{12}$)$_2$Ni] and contains bands at 2505 (B-H), 1950 (B-H-B) and 984, 1008, and 1022 cm$^{-1}$. The electronic spectrum in acetonitrile was the same as that recorded for [(C$_4$H$_9$)$_3$PH]$_2$ [(B$_{10}$H$_{12}$)$_2$Pd] in Example 1. The $^{11}$B N.M.R. at 32 mc./s. showed three groups of resonances at $-0.22$ p.p.m. (5 B's), 3.0 p.p.m. (3 B's), and $+24.4$ p.p.m. (2 B's); J=128 Hz. [BF$_3$O$_1$C$_2$H$_5$)$_2$=0].

For comparison with the NMR spectrum of Example 2, the above chemical shifts, converted to B(OCH$_3$)$_3$ as standard, are: $+17.9$ p.p.m. (5 B's), $+21.1$ p.p.m. (3 B's) and $+42.5$ p.p.m. (2 B's), J=128 Hz.

EXAMPLE 5

[(CH$_3$)$_4$N]$_2$[(B$_{10}$H$_{12}$)$_2$Pt]

The procedure of Example 4 was used to prepare the platinum derivative. Addition of NaB$_{10}$H$_{13}$ (0.03 mole) in tetrahydrofuran to a slurry of 2.7 g. (0.0075 mole) dichloro(norbornadiene)platinum led, after precipitation with aqueous tetramethylammonium chloride and purification, to 3.5 g. of [(CH$_3$)$_4$N]$_2$[B$_{10}$H$_{12}$)$_2$Pt].

*Analysis.*—Cal'd for [CH$_3$)$_4$N]$_2$[(B$_{10}$H$_{12}$)$_2$Pt] (percent): C, 16.5; H, 8.3; N, 4.8; B, 37.2; Pt, 33.5. Found (percent): C, 16.1; H, 8.3; N, 4.8; B, 34.9; Pt, 31.8.

The infrared spectrum contains bands at 2510 (B-H terminal), 1948 (B-H-B bridge) and a sequence of bands, in order of increasing intensity, at 1020, 1008, and 987 cm.$^{-1}$. The IR spectrum resembles those of the nickel, palladium and cobalt complexes in having identical shapes from 4000 to 700 cm.$^{-1}$ but showing slight frequency shifts of individual bands. The $^{11}$B N.M.R. spectrum at 32 mc./s. contains resonances centered at $-7.75$, $+2.22$ (J=142 Hz.), $+6.42$ (J≈128 Hz.) (8 B's) and 24.4 p.p.m. (J=133 Hz.) (2 B's) [BF$_3$·O(C$_2$H$_5$)$_2$=0].

Conversion of these N.M.R. data to chemical shifts using B(OCH$_3$)$_3$ as standard gives: $+10.3$, $+20.3$ p.p.m. (J=142 Hz.), $+24.5$ p.p.m. (J≈128 Hz.) (8 B's) and $+42.5$ p.p.m. (J=133 Hz.) (2 B's).

The above reaction and isolation was conducted under N$_2$ or Ar atmosphere.

EXAMPLE 6

[(CH$_3$)$_4$N]$_2$[(B$_{10}$H$_{12}$)$_2$Co]

A filtered solution of NaB$_{10}$H$_{13}$ (0.04 mole) in diethyl ether (125 ml.) was added to a slurry of CoCl$_2$ in 30 ml. of tetrahydrofuran. The reaction mixture was stirred for 15 minutes, diluted with 200 ml. of diethyl ether and filtered. The filtrate was diluted with 100 ml. of heptane and extracted twice with 250 ml. of water. The aqueous extract was immediately filtered into an aqueous tetramethylammonium chloride solution. A red precipitate formed and was collected and recrystallized from acetone/water (acidic) to yield 2.0 g. of [(CH$_3$)$_4$N]$_2$ [(B$_{10}$H$_{12}$)$_2$Co].

*Analysis.*—Calc'd for [(CH$_3$)$_4$N]$_2$[(B$_{10}$H$_{12}$)$_2$Co] (percent): C, 21.4; H, 10.7; N, 6.3; B, 48.2; Co, 13.2. Found (percent): C, 22.6; H, 10.8; N, 6.1; B, 47.8; Co, 13.1.

The infrared spectrum is identical in shape, from 4000 to 700 cm.$^{-1}$, to the spectra of the analogous platinum, palladium and nickel complexes. The electronic spectrum contains absorptions at 507 ($\epsilon$=3260), 405 (sh) ($\epsilon$=2680), 325 ($\epsilon$=14,100), 280 ($\epsilon$=15,000) and 220 M$\mu$ ($\epsilon$=19,900).

The above reaction and isolation was conducted under N$_2$ or Ar atmosphere.

UTILITY

Example A

A solution of 0.4 g. of [(CH$_3$)$_4$N]$_2$[(B$_{10}$H$_{12}$)$_2$Co] in 10 ml. of ethanol is heated in a shaker bomb at 85° C. under 30 pounds per square inch pressure of ethylene. After 8 hours reaction, analysis shows that 30% of the ethylene has been reduced to ethane.

Example B

This illustrates the cyclooligomerization of acetylene. A solution of 0.4 g. of [(CH$_3$)$_4$N]$_2$[(B$_{10}$H$_{12}$)$_2$Ni] in 60 ml. of acetonitrile was heated in a shaker bomb at 200° C. and 540 pounds per square inch of acetylene pressure. Analysis of the product showed that about 10% of the acetylene was converted to benzene and 3% to cyclooctatetrene.

Example C

Small skeins of cotton yarn were immersed in acetone solutions of [(CH$_3$)$_4$N]$_2$[(B$_{10}$H$_{12}$)$_2$M] (M=Co, Ni, Pt, Pd), allowed to soak briefly, removed and air-dried. The yarn dyed by the palladium, platinum and cobalt compounds was washfast to both water and soap. Part of the nickel dye was removed in a water or soap/water wash.

| N | Dried yarn | Color after water wash | Color after soap wash |
|---|---|---|---|
| Co | Dark red | Dark red | Dark red. |
| Ni | Orange red | Light orange | Light orange. |
| Pt | Dark yellow | Dark yellow | Dark yellow. |
| Pd | Light yellow | Light yellow | Light yellow. |

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A compound having the formula $$[M(B_{10}H_{12})_2]^{(4-z)-}A_{\frac{4-z}{z'}}$$

in which M is a metal of Group VIII of the Periodic Table, z is from 1 to 3 inclusive and A is a cation of valence z' selected from the class consisting of alkali metal ions, alkaline earth metal ions, lower alkyl ammonium ions, lower alkyl phosphonium ions, lower alkyl arsonium ions and lower alkyl sulfonium ions.

2. Composition of claim 1 wherein A is a lower alkyl quaternary ammonium ion.

3. Composition of claim 1 wherein A is a lower alkyl phosphonium ion.

4. [(n—C$_4$H$_9$)$_3$PH]$_2$[Pd(B$_{10}$H$_{12}$)$_2$].
5. [(CH$_3$)$_4$N]$_2$[Ni(B$_{10}$H$_{12}$)$_2$].
6. [(C$_2$H$_5$)$_4$N]$_2$[Ni(B$_{10}$H$_{12}$)$_2$].
7. [(CH$_3$)$_4$N]$_2$[(B$_{10}$H$_{12}$)$_2$Pd].
8. [(CH$_3$)$_4$N]$_2$[(B$_{10}$H$_{12}$)$_2$Pt].
9. [(CH$_3$)$_4$N]$_2$[(B$_{10}$H$_{12}$)$_2$Co].
10. A process for preparing compounds having the formula $$[M(B_{10}H_{12})_2]^{(4-z)-}A_{\frac{4-z}{z'}}$$

wherein M is a metal of Group VIII of the Periodic Table, z is from 1 to 3 inclusive and A is a cation of valence z' selected from the class consisting of alkali metal ions, alkaline earth metal ions, lower alkyl ammonium ions, lower alkyl phosphonium ions, lower alkyl arsonium ions and lower alkyl sulfonium ions which comprises the step of reacting, in solution, a salt of B$_{10}$H$_{13}$$^-$ with a compound having the formula:

$$L^x_{n}xM^xX_2$$

in which x is the number of the transition series of M, X is a halogen having an atomic number of from 17 to 53; $n^1$ is 0, 1 or 2, $n^2$ and $n^3$ are each 2, and L$^1$ is an electron donating ligand of the formula $QR_3$ or $QAr_3$ and two $L^1$ ligands are jointly $$R_2Q\text{---}(CH_2)_m\text{---}QR_2 \text{ or } Ar_2Q\text{---}(CH_2)_mQAr_2$$

$L^2$ is $QR_3$, acyclic monoolefins of 2–12 carbon atoms and two $L^2$ ligands jointly are $R_2Q\text{---}(CH_2)_m\text{---}QR_2$, an alicyclic 1,4-diolefin of 6 to 12 carbon atoms or an alicyclic 1,5-diolefin of 8 to 12 carbon atoms; and
$L^3$ is an acyclic monoolefin of 2 to 12 carbon atoms, and two $L^3$ jointly are an alicyclic 1,4-diolefin of 6 to 12 carbon atoms, or an alicyclic 1,5-diolefin of 8 to 12 carbon atoms;

wherein Q is arsenic or phosphorus, $m$ is 2 or 3, R is an alkyl radical and Ar is an aryl radical, with the proviso that the number of carbons per phosphorus or arsenic radical does not exceed 20.

References Cited

UNITED STATES PATENTS 3,376,343  4/1968  Knoth et al. _____ 260—567.6

OTHER REFERENCES

Greenwood et al., J. Chem. Soc. (A), (1967), pp. 880–4.

TOBIAS E. LEVOW, Primary Examiner

A. P. DEMERS, Assistant Examiner

U.S. Cl. X.R.

8—52, 54.2; 23—361, 362, 363; 252—439, 666, 673, 683.9